United States Patent [19]

Baker

[11] 4,007,593
[45] Feb. 15, 1977

[54] MOTOR VEHICLE OPEN CENTER SERIES HYDRAULIC CIRCUIT

[75] Inventor: James P. Baker, Cleveland, Ohio
[73] Assignee: The Weatherhead Co., Cleveland, Ohio
[22] Filed: June 30, 1975
[21] Appl. No.: 591,842

Related U.S. Application Data

[63] Continuation of Ser. No. 379,319, July 16, 1973, abandoned.

[52] U.S. Cl. .................................. 60/548; 60/405; 91/28; 91/371; 91/372
[51] Int. Cl.² ........................................ B60T 13/18
[58] Field of Search ............... 91/6, 371, 372, 373, 91/378, 412, 422, 446, 434; 60/548, 404, 405, 420; 137/101, 118, 119

[56] References Cited

UNITED STATES PATENTS

| | | | |
|---|---|---|---|
| 3,434,282 | 3/1969 | Shelhart | 60/405 |
| 3,455,210 | 7/1969 | Allen | 91/446 |
| 3,458,998 | 8/1969 | Bishop | 91/6 X |
| 3,602,243 | 8/1971 | Holt et al. | 91/446 X |
| 3,662,548 | 5/1972 | Suzuki et al. | 137/101 X |
| 3,712,176 | 1/1973 | Meyers | 91/6 |
| 3,747,473 | 7/1973 | Bach et al. | 91/373 |
| 3,802,195 | 4/1974 | Lewis | 60/404 X |

Primary Examiner—Carlton R. Croyle
Assistant Examiner—Edward Look
Attorney, Agent, or Firm—McNenny, Pearne, Gordon, Gail, Dickinson & Schiller

[57] ABSTRACT

A motor vehicle fluid power circuit is disclosed which includes a primary pump, a closed center brake booster, and an open center steering valve. These components are hydraulically connected in series with the fluid flowing from the pump to the closed center brake booster and then to the open center steering valve. The brake booster includes valve means throttling fluid flow from the pump to the steering valve and maintaining the outlet pressure of the pump at at least a predetermined pressure differential above the working pressure of the brake booster under normal operating conditions in order to conserve output load requirements of the pump while assuring adequate pump pressure for brake booster actuation. In a second embodiment, a back-up pump is also provided in the circuit, and a pilot valve hydraulically disconnects the primary pump and hydraulically connects the back-up pump to the brake booster in response to a fluid pressure failure in the primary pump.

5 Claims, 2 Drawing Figures

MOTOR VEHICLE OPEN CENTER SERIES HYDRAULIC CIRCUIT

This is a continuation, of application Ser. No. 379,319 filed July 16, 1973, now abandoned.

BACKGROUND OF THE INVENTION

This invention relates generally to a hydraulic fluid power circuit, and more particularly to a motor vehicle hydraulic fluid power circuit having a hydraulic pump for supplying fluid to assist the operator in steering and braking the vehicle.

Motor vehicles are frequently provided with a hydraulic pump which is driven by the engine of the vehicle to provide a source of fluid power. In passenger cars, this fluid power is frequently used to assist the operator in steering the vehicle. Because of increasing automobile braking performance requirements and because of a decreasing ability of intake manifold vacuum braking systems to provide that performance, it has been suggested to use the fluid power of the engine-driven hydraulic pump to assist the operator in braking the vehicle, as well as to assist the operator in steering the vehicle.

CROSS REFERENCE TO RELATED APPLICATIONS

Reference is made to the copending United States patent application of Frederick D. Keady, Ser. No. 353,248, now U.S. Pat. No. 3,834,162, filed Apr. 23, 1973, and to the copending United States patent application of applicant, Ser. No. 354,710, now Pat. No. 3,841,095 filed Apr. 26, 1973, both assigned to the assignee of this application.

SUMMARY OF THE INVENTION

The present invention provides a motor vehicle fluid power circuit which includes a primary pump, a steering valve, and a brake booster. The steering valve is an open center valve and the brake booster is a closed center valve. First means are provided hydraulically connecting the primary pump in series to the brake booster and the steering valve, with the fluid flowing first to the closed center brake booster and then to the open center steering valve. Second means are provided in the brake booster for throttling fluid flow from the primary pump to the steering valve in such a manner as to maintain the outlet pressure of the pump at at least a predetermined pressure differential above the working pressure of the brake booster under normal (i.e., non-emergency) operating conditions in order to conserve output load requirements of the pump.

A STRUCTURE

The second means includes a control spool slidably disposed in a bore, and the control spool includes valve means movable with the control spool between an open position and a closed position for throttling fluid flow from the primary pump to the steering valve. The control spool includes a net lateral effective area exposed to brake booster working pressure, and such net area faces in a direction to urge the control spool toward the closed position. In this manner, the brake booster working pressure acts on the control spool to move the control spool toward the closed position and increases the pump pressure to maintain the punp pressure at a predetermined pressure differentail above the working pressure in the brake booster. This ensures that adequate pump pressure will always be available to the brake booster and obviates the necessity of pressures any greater than actually required by the brake booster.

An orifice means is provided between the second means and the brake booster power chamber to limit the flow rate from the primary pump to the brake in order to ensure adequate flow capacity from the pump to the steering gear. The invention also provides a relief valve in the brake booster for limiting the maximum working pressure of the brake booster power chamber.

In a second embodiment of the invention, a back-up pump is provided, and third means hydraulically connects the back-up pump to the brake booster and at least partially hydraulically disconnects the first means in response to a fluid pressure failure in the primary pump.

BRIEF DESCRIPTION OF THE DRAWINGS

These and other aspects and advantages of the invention are incorporated in the embodiments of the invention shown in the drawings, wherein.

DESCRIPTION OF THE PREFERRED EMBODIMENTS

First Embodiment

Figure 1:
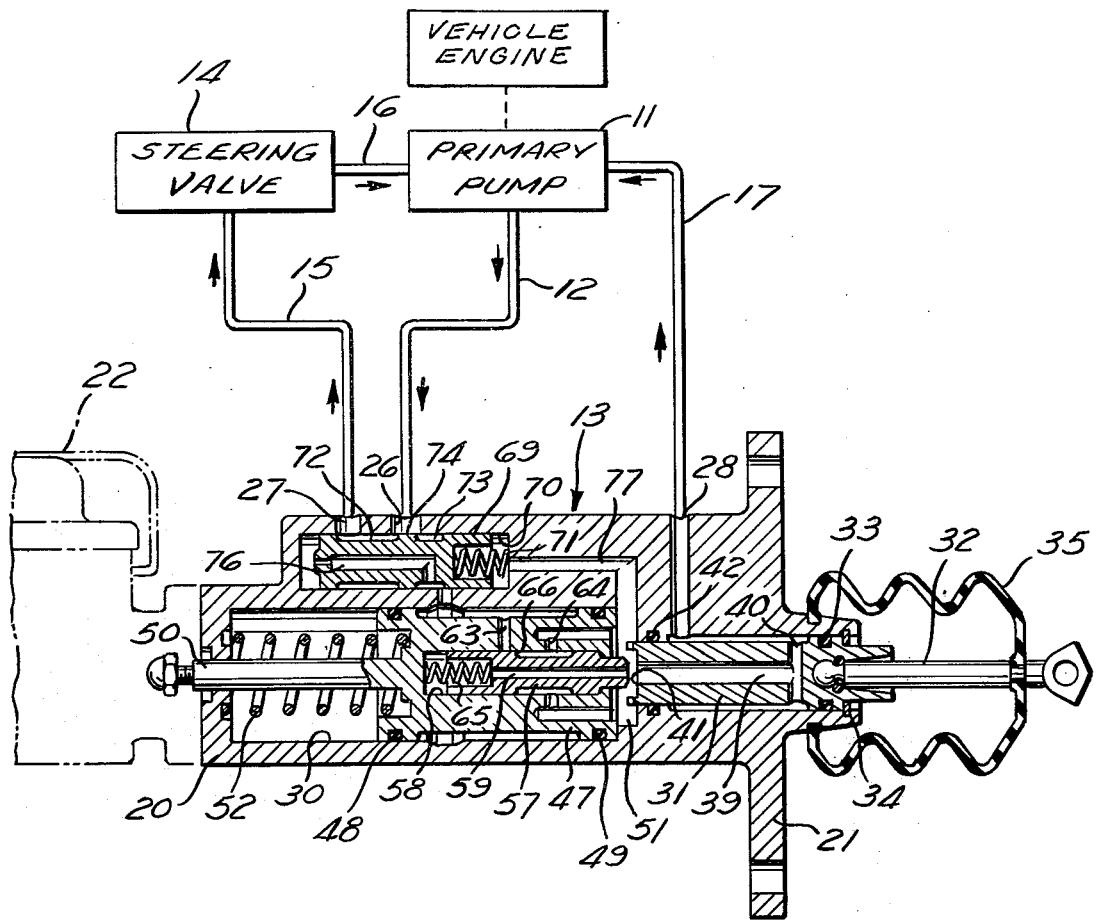
FIG. 1 is a schematic circuit diagram of a first preferred embodiment of a motor vehicle fluid power circuit according to the principles of the invention, with the brake booster shown in cross section.

Referring now to the drawings in greater detail, FIG. 1 is a schematic circuit diagram of a first preferred embodiment of a motor vehicle fluid power circuit incorporating the principles of the invention.

The circuit shown in FIG. 1 includes a primary hydraulic pump 11 providing a source of fluid power for the circuit. The pump 11 is driven by the engine of the motor vehicle, and in the first embodiment the pump 11 is a constant displacement pump having an output of 2.5 gallons per minute and is of the type commonly used in motor vehicle power steering systems at the present time. The pump 11, in a well known manner, includes an internal relief valve which connects the outlet of the pump to the inlet of the pump when a predetermined maximum pressure is reached to prevent damage to the pump or to the remainder of the circuit. In the embodiment shown in FIG. 1, the internal relief pressure of the pump 11 is set at 1200 p.s.i.

A suitable line 12 carries the entire output of the pump 11 to a brake booster 13. The brake booster 13, as discussed in detail below, is a closed center valve which uses no fluid whatsoever from the pump 11 except during brake actuation movement. All fluid from the pump 11 which is not used by the brake booster 13 flows to a steering valve 14 through a line 15. Drain lines 16 and 17 provide a return flow path to the primary pump 11 from the steering valve 14 and brake booster 13, respectively.

The steering valve 14 is an open center steering valve of the type conventionally used in automobiles at the present time. The steering valve 14 directs the fluid which it receives back to the pump 11 through drain line 16 when the steering valve is in its neutral or center position. When fluid from the pump 11 is required to assist in the steering of the vehicle and the steering valve 14 is displaced from its center position, the steering valve 14 directs at least some of the fluid received through the line 15 to a fluid motor (not shown) of the motor vehicle power steering system in a well known manner.

The brake booster 13 includes a generally cylindrical axially extending housing 20. An annular mounting flange 21 is provided on the right end of the housing 20 for securing the brake booster 13 to a firewall (not shown) of the motor vehicle. The brake booster 13 is interposed between a foot-operated brake pedal (not shown) of the motor vehicle and a master cylinder 22 of the motor vehicle to assist the operator in the application of the brakes in a manner discussed in detail below.

The housing 20 includes an inlet port 26 which is hydraulically connected to the line 12 to receive the entire output of the pump 11 under all conditions. A first outlet port 27 is hydraulically connected to the line 15 to supply the fluid from the pump 11 which is not used by the brake booster 13 to the steering valve 14. As described in greater detail below, the brake booster 13 is a closed center valve which allows the entire output of the pump 11 to be supplied to the steering valve 14 except during brake actuation movement. A second outlet port 28 is hydraulically connected to the line 17 to return the fluid which is used by the brake booster 13 during brake actuation movement to the inlet of the pump 11 upon brake release.

As further shown in FIG. 1, a bore 30 extends axially through the housing 20. An input rod 31 is slidably disposed in the right end of the bore 30, and a connecting rod 32 is secured to the input rod 31 by a suitable retaining ring to connect the brake pedal (not shown) to the input rod 31. A seal 33 prevents fluid leakage between the input rod 31 and the right end of the bore 30, and a snap ring 34 prevents the input rod 31 from being pulled out of the right end of the bore 30. A suitable dust cap 35 is also provided to prevent dust or other contaminants from entering the right end of the bore 30.

An axially extending outlet passage 39 extends from one end of the input rod 31, and a radial passage 40 establishes open fluid pressure communication between the outlet passage 39 and the outlet port 28. An annular end portion 41 of the input rod 31 surrounds the passage 39 and provides an annular valve seat or valve number as described in greater detail below. A suitable seal 42 prevents fluid leakage between the bore 30 and the left end of the input rod 31.

A power piston 47 is also slidably disposed in the bore 30. A first seal 48 and a second seal 49 prevent fluid leakage between the power piston 47 and the bore 30. The power piston 47 includes an output rod 50 at its left end for exerting a force on the master cylinder 22 to which the brake booster 13 is connected. In the embodiment shown in FIG. 1, the output rod 50 is shown schematically as a single piece with the power piston 47, but the output rod 50 could alternatively be made as a separate piece. The right end of the power piston 47 cooperates with the bore 30 to define a power chamber 51. A return spring 52 urges the power piston 47 to the right to the position shown in FIG. 1.

A poppet 57, which may be of steel or other suitable material, is slidably disposed in a bore 58 in the power piston 47 and is carried by the power piston 47. An axial passage 59 extends through the poppet 57 so that the left end of the poppet 57 is exposed to drain line pressure in the outlet passage 39 under all conditions.

A radially extending inlet passage 63 extends from the outer periphery of the power piston 47 to the bore 58. A second radial passage 64 establishes fluid pressure communication between the bore 58 and the power chamber 51. A spring 65 biases the poppet 57 to the right to the position shown in FIG. 1, in which a valving land 66 of the poppet 57 closes off the inlet passage 63 to hydraulically isolate the inlet passage 63 from the power chamber 51 when the brake booster is deactuated. When the poppet 57 is displaced to the left from the position shown in FIG. 1, the valving land 66 moves to the left past the inlet passage 63 to establish throttled fluid pressure communication between the inlet passage 63 and the fluid power chamber 51 through the radial passage 64 in a manner described in greater detail below.

A control spool 69 is slidably disposed in a bore 70 in the housing 20 and is spring-biased to the left from the position shown in FIG. 1 by a coil spring 71. Annular grooves 72 and 73 define a throttling land 74 on the control spool 69, and the land 74 throttles fluid flow from the pump 11 to the steering valve 14 and maintains the outlet pressure of the pump 11 at at least a predetermined pressure differential above the working pressure of the brake booster fluid power chamber 51 in a manner described below.

A passage 76 extends through the control spool 69 and communicates the pressure in the inlet passage 26 (which is the same as the outlet pressure of the pump 11) to the left end face of the control spool 69. A passage 77 in the housing 20 establishes fluid pressure communication between the power chamber 51 and the right end face of the control spool 69 (which in the preferred embodiment is of equal lateral cross-sectional area to the left end face of the control spool 69). In this manner, the control spool 69 is urged to the left by the spring 71 and by the pressure in the fluid power chamber 51 to close communication between the ports 26 and 27, and the control spool 69 is urged to the right by the outlet pressure of the pump 11 to open communication between the ports 26 and 27. When these opposed forces are equal, the control spool 69 is in a balanced condition and remains stationary. When these opposed forces are unequal, the control spool 69 is in an unbalanced condition and moves to the right or left in the bore 70.

B. Operation 1. steering valve and brake booster deactuated.

Turning now to the operation of the circuit shown in FIG. 1, the various components of the circuit are shown with the steering valve 14 in its neutral or center position and with the brake booster 13 deactuated. With the components in this position, the entire output of the pump 11 flows through the line 12 and into the inlet port 26. When the pump 11 is initially started-up, the control spool 69 is held in the far left position by the spring 71 until the pump pressure acting through the passage 76 on the left end of the control spool 69 moves the control spool 69 to the right to the position shown in FIG. 1. The fluid from the pump 11 then flows from the inlet port 26, past the left edge of the throttling land 74, and out the first outlet port 27 to the open center steering valve 14. The fluid then flows through the open center steering valve 14 and through the drain line 16 back to the inlet of the pump 11.

Under these conditions, the control spool 69 maintains the outlet pressure of the pump 11 at a predetermined pressure differential above the drain line pressure in the power chamber 51. The force urging the control spool 69 to the right is the force created by the pump pressure acting on the left end of the control spool 69, and the force urging the control spool 69 to the left is the sum of the force of the spring 71 and the force of the drain line pressure in the power chamber 51 acting on the right end of the control spool 69. Because the left and right ends of the control spool 69 are of equal areas, the pump pressure must exceed the fluid power chamber pressure for the spool 69 to remain in the position shown in FIG. 1 due to the force of the spring 71. If the pump pressure does not exceed the pressure in the fluid power chamber 51, the control spool 69 is moved to the left by the spring 71 so that the left edge of the throttling land 74 further restricts the flow of fluid from the inlet port 26 to the steering valve 14 to increase the pump pressure. If the pump pressure exceeds the pressure in the fluid power chamber 51 by more than the effective pressure of the spring 71, the control spool 69 is moved to the right so that the left edge of the throttling land 74 decreases the restriction of fluid flow to the steering valve 14 to decrease the pump pressure. When the power chamber 51 is connected to the drain line 17 (which is at zero gauge pressure in the preferred embodiment), the left edge of the throttling land 74 restricts the flow of fluid from the pump 11 to the steering valve 14 enough that the outlet pressure of the pump 11 equals the effective pressure of the spring 71. In the preferred embodiment, the spring 71 is selected to maintain the outlet pressure of the pump 11 at 50 p.s.i. when the steering valve 14 is in its neutral position and the brake booster 13 is deactuated.

2. steering valve actuation and subsequent brake booster actuation.

When the brake booster is in its deactuated position shown in FIG. 1 and the steering valve 14 is moved from its center position to restrict the flow of fluid from the line 15 to the drain line 16, the output pressure of the constant displacement pump 11 increases to overcome this restriction. This increased pump pressure is transmitted through the passage 76 and acts on the left end of the control spool 69 to move the control spool 69 further to the right from the position shown in FIG. 1. This moves the left edge of the throttling land 74 further to the right to further open the passage from the inlet port 26 to the first outlet port 27 to minimize pressure loss from the pump 11 to the steering valve 14. Under these conditions, the control spool 69 may move all the way to the right in the bore 70 until it engages the right end of the bore 70. When this occurs, the right end of the throttling land 74 will move to the right past the inlet port 26. However, because of the small clearance between the outer periphery of the control spool 69 and the inner surface of the bore 70, a leakage path is maintained between the inlet port 26 and the inlet passage 63 so that fluid is still supplied to the brake booster.

When the steering valve 14 is actuated in this manner so that the outlet pressure of the pump 11 is increased, the brake booster 13 can be actuated. When the vehicle operator moves the input rod 31 to the left as viewed in FIG. 1 by applying a force to the brake pedal (not shown), the valve seat 41 engages the poppet 57. This hydraulically isolates the power chamber 51 from the outlet passage 39. Further movement of the input rod 31 to the left also moves the poppet 57 against the force of the spring 65 to the left until the valving land 66 of the poppet 57 moves slightly past the inlet passage 63. This establishes throttled fluid pressure communication between the high pump pressure in the inlet passage 63 and the fluid power chamber 51. This pressure which is admitted to the fluid power chamber 51 acts against the power piston 47 and begins to move the power piston 47 to the left as viewed in FIG. 1. This increased pressure in the power chamber 51 also acts on the input rod 31 to provide a reaction force which the vehicle operator can feel through the connecting rod 32 and the brake pedal.

If the input force on the input rod 31 applied by the operator of the vehicle remains constant, the increased pressure in power chamber 51 pushes the power piston 47 to the left while the input rod 31 remains stationary. The spring 65 retains the poppet 57 against the valve seat 41, so that the poppet 57 remains stationary against the valve seat 41 while the power piston 47 moves to the left until the valving land 66 closes the inlet passage 63. When this occurs, the fluid pressure in the power chamber 51 remains constant so that the braking effort applied through the output rod 50 on the master cylinder 22 remains constant.

If the vehicle operator applies an input force of increasing magnitude on the input rod 31, the input rod 31 will continue to move to the left with the power piston 47 to retain the valving land 66 in the open position until the desired amount of braking has been achieved. When the input force on the input rod 31 is released, the force of the fluid pressure in the chamber 51 moves the input rod 31 back to the right to separate the valve seat 41 from the poppet 57. This throttles the fluid in the power chamber 51 through the passages 39 and 40 to the second outlet port 28 to release the force applied to the master cylinder 22 by the output rod 50.

If, under these conditions of steering valve actuation and subsequent brake booster actuation, the brake booster requires a pressure greater than the pressure required by the steering valve 14, the control spool 69 increases the pump pressure to a pressure level above the working pressure of the brake booster in the power chamber 51 so that adequate pump pressure is always available for the brake booster 13. To accomplish this, the working pressure of the brake booster in the power chamber 51 acts on the right end of the control spool 69. When this pressure plus the effective pressure of the spring 71 exceed the force of the pump pressure acting to the right on the control spool 69, the control spool 69 moves to the left until the left side of the valving land 74 restricts the flow of fluid from the inlet port 26 to the steering valve 14 sufficiently to increase the outlet pressure of the pump 12. The output pressure of the pump 11 increases until the pump pressure acting to the right on the control spool 69 equals the working pressure of the brake booster 13 plus the effective pressure of the spring 71 acting to the left on the control spool 69. In this manner, the control spool 69 maintains the outlet pressure of the pump 11 at at least a predetermined pressure differential (the amount of such predetermined pressure differential is equal to the effective pressure of the spring 71) above the working pressure in the brake booster 51.

After the brake booster 13 has been deactuated and the steering valve 14 is deactuated, the outlet pressure of the pump 11 decreases to the 50 p.s.i. minimum pressure level maintained by the control spool 69 in the manner described above.

3. brake booster actuation and subsequent steering valve actuation

If the steering valve 14 is in the neutral position and the brake booster 13 is actuated, the control spool 69 maintains the outlet pressure of the pump 11 the aforementioned predetermined pressure differential above the working pressure of the brake booster in the fluid pressure chamber 51. As soon as the brake booster is actuated in the manner described above so that the fluid pressure from the inlet passage 63 is throttled past the valving land 66 into the power chamber 51, such increased pressure in the power chamber 51 acts on the control spool 69 and moves the control spool 69 further to the left as viewed in FIG. 1. This causes the left side of the throttling land 74 to impose a further restriction on the flow of fluid from the pump 11 to the steering valve 14 so that the pressure in the pump 11 increases to get past this restriction. This action of the control spool 69 continues for all pressures in the power chamber 51.

In at any time during such actuation of the brake booster 13 the steering valve 14 is actuated, sufficient flow capacity from the pump 11 is always available to the steering valve 14. This is because the valving land 66 is dimensioned so that it can only open the inlet passage 63 a small amount even when it is pushed to the left by the input rod 31 until the input rod 31 engages the power piston 47. This provides a restrictive orifice under all conditions to limit the flow rate of fluid to the fluid power chamber 51 to insure adequate flow capacity for the steering valve 14.

As described in detail above with particular reference to the pump 11, the pump 11 includes an internal relief valve which connects the outlet of the pump to the inlet of the pump when the outlet of the pump reaches 1200 p.s.i. The brake booster 13 shown in FIG. 1 provides a safety relief valve which prevents the brake booster 13 from demanding a pressure in excess of 1150 p.s.i. from the pump 11. This assures that the brake booster 123 can never, even under emergency stopping conditions, cause the pump 11 to reach its internal relief pressure of 1200 p.s.i. which would cause the output flow rate of the pump 11 to decrease to zero so that there would be no flow for operation of the steering valve 14.

In the embodiment shown in FIG. 1, this is accomplished by the poppet 57. As described above, the axial passage 59 maintains the left end face of the poppet 57 at drain line pressure when the input rod 31 is moved to the left so that the valve seat 41 engages the poppet 57. When the valve seat 41 engages the poppet 57, the poppet 57 also has a net lateral cross-sectional area exposed to pressure in the power chamber 51. Under emergency stopping conditions of maximum braking effort, the left end face of the input rod 31 engages the right end face of the power piston 47. The spring 65 is arranged so that when this occurs a pressure of 1150 p.s.i. in the power chamber 51 acting against the net lateral effective area of the poppet 57 which is exposed to pressure in the power chamber 51 moves the poppet 57 to the left. Because the input rod 31 can move no further to the left relative to the power piston 47 when this occurs, the poppet 57 moves away from the valve seat 41. This throttle fluid from the power chamber 51 to the outlet passage 39 and limits the pressure in the power chamber 51 to 1150 p.s.i.

Second Embodiment

Figure 2:
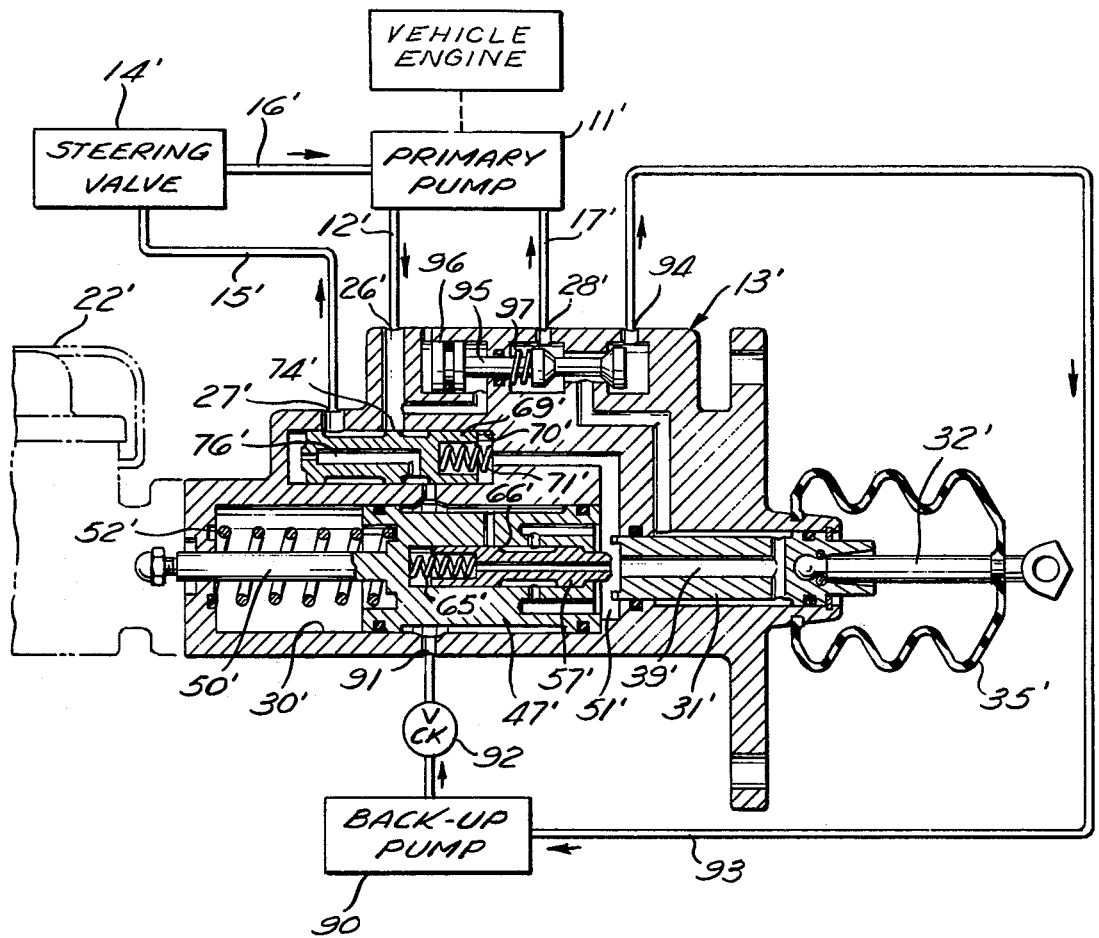
FIG. 2 is a schematic circuit diagram of a second preferred embodiment of a motor vehicle fluid power circuit according to the principles of the invention, with the brake booster shown in cross section.

Referring now to FIG. 2, a second preferred embodiment of the hydraulic circuit and brake booster according to this invention is shown.

A. Structure

The fluid power circuit shown in FIg. 2 operates in exactly the same manner as the fluid power circuit shown in FIG. 1, except that the embodiment shown in FIG. 2 also provides an emergency back-up system for the brake booster. With this exception, the circuit shown in FIG. 2 is of identical structure and mode of operation to the circuit shown in FIG. 1. Component parts of the circuit shown in FIG. 2 which correspond to component parts of the circuit shown in FIG. 1 are identified by reference numerals which are identical to the reference numerals of FIG. 1 but are followed by a prime. For clarity in the drawings, all of the reference numerals on FIG. 1 are not repeated on FIG. 2.

The emergency back-up system for the circuit shown in FIG. 2 includes a back-up pump 90 which is hydraulically connected to a second inlet port 91 in the brake booster housing 25 through a one-way check valve 92. A drain line 93 hydraulically connects an outlet port 94 of the brake booster housing to the inlet of the back-up pump 90.

The back-up pump 90 is a suitable constant displacement pump having an internal relief valve. The pump 90 is driven at a substantially constant speed by an electric motor and is actuated by a suitable pressure responsive electrical switch in response to a fluid pressure failure in the primary system. The back-up pump 90 operates against its internal relief valve to maintain a constant pressure of 1000 p.s.i. in the second inlet port 91 when the pump 90 is actuated.

The back-up system shown in FIG. 2 also includes a pilot valve 95. The pilot valve 95 is a one-piece valve slidably diposed in a suitable bore in the brake booster housing. The pilot valve 95 includes a plunger portion 96 having its left end exposed to atmospheric pressure through a suitable vent passage and having its right end exposed to pressure of the primary pump 11'.

B. Operation

When the primary pump 11' is operating and the output pressure of the pump 11' is maintained at its 50 p.s.i. minimum pressure by the control spool 69', the outlet pressure of the pump 11' acting on the right side of the plunger portion 96 retains the pilot valve 95 in the left position shown in FIg. 2. In this position, the outlet passage 39' is hydraulically connected to the outlet port 28' leading to the primary pump 11' and is hydraulically disconnected from the outlet port 94 leading to the back-up pump 90 by operation of the pilot valve 95. Under these conditions of normal operation of the primary pump 11', the hydraulic circuit shown in FIG. 2 functions in the same manner as the hydraulic circuit shown in FIG. 1.

In the event of a fluid pressure failure in the primary system, the fluid pressure acting on the rightwardly facing surface of the plunger portion 96 is not sufficient to retain the pilot valve 95 in its left position shown in FIG. 2, and a pilot spring 97 moves the pilot valve 95 to the right. In this right position, the pilot valve 95 hydraulically isolates the primary pump 11' from the outlet passage 39' and hudraulically connects the inlet side of the back-up pump 90 to the outlet passage 39'. At the same time, the spring 71' retains the control spool 69' in its left position because there is no fluid pressure acting on the right end of the control spool 69'. When the control spool 69' is in this left position, the rightmost portion of the control spool 69' closes the passage leading from the bore 70' to the bore 30' to hydraulically isolate the brake booster from the outlet side of the primary pump 11' and prevent flow of fluid from the second inlet port 91 to the primary system.

After the primary system has been hydraulically disconnected from the brake booster by operation of the pilot valve 95 and the control spool 69', the brake booster 13', the brake booster 13' functions in the manner described above to the throttle fluid pressure from the second inlet port 91 to the power chamber 51' to move the power piston 47' to the left as viewed in FIG. 2 and actuate the master cylinder 22'. When the input force on the input rod 31' is released, the fluid from the power chamber 51' flows through the outlet passage 39' and through the outlet port 94 back to the inlet side of the backup pump 90.

What is claimed is:

1. A motor vehicle fluid power circuit comprising a primary pump having an inlet side and an outlet side, a steering valve, a brake booster having an inlet side and an outlet side, and an auxiliary pump having an inlet side and an outlet side, said steering valve being an open center valve, said brake booster having a fluid power chamber and a power piston movable in response to the working pressure in said power chamber, first means hydraulically connecting said primary pump outlet side to said steering valve and hydraulically connecting said primary pump outlet side to said brake booster, second means responsive to the working pressure of said brake booster throttling fluid flow from said primary pump outlet side to said steering valve and maintaining the pressure of said primary pump outlet side at at least a predetermined pressure differential above the working pressure of said brake booster power chamber under all normal operating conditions, and pilot valve means responsive to the pressure level of said primary pump outlet side hydraulically connecting the outlet side of said brake booster to the inlet of said auxiliary pump under emergency conditions when said primary pump is inoperable 2. In a motor vehicle having an engine for propelling the vehicle, a fluid circuit comprising a pump driven by the engine of the vehicle and having an outlet side, a steering valve providing a power assist for steering the vehicle, and a brake booster providing a power assist for braking the vehicle, said pump being a constant displacement pump, said steering valve being an open center valve, said brake booster being a closed center device having a fluid power chamber and a power piston movable in response to the working pressure in said power chamber, first means hydraulically connecting said pump outlet side to said steering valve and hydraulically connecting said pump outlet side to said brake booster, said first means including a bore, second means responsive to the working pressure of said brake booster maintaining the pressure of said pump outlet side at at least a predetermined pressure differential above the working pressure of said brake booster under all normal operating conditions, said second means including a control spool slidably disposed in said bore and movable between an open position and a closed position for throttling fluid flow from said pump outlet side to said steering valve, said brake booster includes an input rod, a power piston slidably disposed in a bore in axially aligned relation to said input rod, said power piston and said bore defining a fluid power chamber on one side of said power piston adjacent said input rod, an outlet port, a passage extending axially through said input rod establishing fluid pressure communication between said fluid power chamber and said outlet port, an annular valve seat surrounding one end of said passage, a poppet slidably carried on said power piston and engageable with said annular valve seat to close said passage and isolate said fluid power chamber from said outlet port, said poppet being movable toward and away from said input rod and being spring biased toward said input rod, said poppet including a net lateral effective area exposed to pressure in said fluid power chamber, stop means engageable by said input rod limiting movement of said input rod toward said poppet, and said poppet being movable away from said input rod by a predetermined maximum working pressure in said fluid power chamber acting on said net area when said input rod engages said stop means.

3. A motor vehicle fluid power circuit comprising a primary pump having an inlet side and an outlet side, a steering valve, a brake booster having an inlet side and an outlet side, and an auxiliary pump having an inlet side and an outlet side, said primary pump being a constant displacement pump, said steering valve being an open center valve, said brake booster being a closed center device having a fluid power chamber a power piston movable in response to the working pressure in said power chamber, first means hydraulically connecting said primary pump outlet side to said steering valve and hydraulically connecting said primary pump outlet side to said brake booster, said first means including a bore, second means responsive to the working pressure of said brake booster maintaining the pressure of said primary pump outlet side at at least a predetermined pressure differential above the working pressure of said brake booster under all normal operating conditions, said second means including a control spool slidably disposed in said bore and movable between an open position and a closed position for throttling fluid flow from said primary pump outlet side to said steering valve, and pilot valve means responsive to the pressure level of said primary pump outlet side hydraulically connecting the outlet side of said brake booster to the inlet side of said auxiliary pump under emergency conditions when said primary punp is inoperable.

4. A motor vehicle fluid power circuit comprising a primary pump, an auxiliary pump, a steering valve, and a brake booster; said primary pump and said auxiliary pump each having an inlet side and an outlet side; said steering valve being an open center valve and having an inlet side and an outlet side; said brake booster including an input rod movable toward and away from a deactuated position, a power piston slidably disposed in a bore in axially aligned relation to said input rod, said power piston and said bore defining a fluid power chamber on one side of said power piston adjacent said input rod, an output rod on the other side of said power piston, a fluid inlet passage, a fluid outlet passage, first valve means movable by said input rod for opening and closing fluid pressure communication between said fluid power chamber and said outlet passage, second valve means movable by said input rod and axially spaced from said first valve means for opening and closing fluid pressure communication between said fluid power chamber and said inlet passage, said first valve means being open and said second valve means being closed when said input rod is in said deactuated position, a control spool interposed between said outlet side of said pump and said inlet passage, said control spool including means responsive to the working pressure of said brake booster for throttling fluid pressure communication between said primary pump outlet side and said steering valve inlet side and for maintaining the pressure in said inlet passage at at least a predetermined pressure differential above the pressure in said fluid power chamber, said control spool including a net lateral cross-sectional area exposed to the pressure of said primary pump outlet side, said control spool being slidably disposed in a bore for opening and closing said means for throttling, said net area facing in a direction to urge said control spool in a direction to open said means for throttling, and pilot valve means responsive to the pressure level of said primary pump outlet side hydraulically connecting said outlet passage of said brake booster to the inlet side of said auxiliary pump and hydraulically isolating said inlet side of said primary pump from said outlet passage of said brake booster under emergency conditions when said primary pump is inoperable.

5. In a motor vehicle having an engine for propelling the vehicle, a fluid power circuit comprising a pump driven by the engine of the vehicle, a steering valve providing a power assist for steering the vehicle, and a brake booster providing a power assist for braking the vehicle, said pump being a constant displacement pump, said steering valve being an open center valve, said brake booster being a closed center device, means hydraulically connecting said pump to said steering valve and hydraulically connecting said pump to said brake booster; and said brake booster including a fluid power chamber, an outlet port, an input rod and a power piston, a valve member and a valve seat one of which is carried on said input rod and the other of which is carried on said power piston, said valve member and valve seat engaging to hydraulically isolate said fluid power chamber from said outlet port when said brake booster is actuated and separating to hydraulically connect said fluid power chamber to said outlet port when said brake booster is deactuated; and means maintaining said valve member and valve seat separated to hydraulically connect said fluid power chamber to said outlet port when a predetermined maximum working pressure is reached in said fluid power chamber, said power piston is slidably disposed in a bore in axially aligned relation to said input rod, said power piston and said bore defining said fluid power chamber on one side of said power piston adjacent said input rod, a passage extending axially through said input rod establishing fluid pressure communication between said fluid power chamber and said outlet port, said valve seat being an annular valve seat surrounding one end of said passage, said valve member being a poppet slidably carried on said power piston and engageable with said annular valve seat to close said passage and isolate said fluid power chamber from said outlet port, said poppet being movable toward and away from said input rod and being spring biased toward said input rod, said poppet including a net lateral effective area exposed to pressure in said fluid power chamber, stop means engageable by said input rod limiting movement of said input rod toward said poppet, and said poppet being movable away from said input rod by a predetermined maximum working pressure in said fluid power chamber acting on said net area when said input rod engages said stop means.

* * * * *

UNITED STATES PATENT AND TRADEMARK OFFICE
CERTIFICATE OF CORRECTION

PATENT NO. : 4,007,593
DATED : February 15, 1977
INVENTOR(S) : James P. Baker

It is certified that error appears in the above-identified patent and that said Letters Patent are hereby corrected as shown below:

Column 1, line 55, "A STRUCTURE" should be deleted.

Column 2, line 8, "booster" should appear after "brake".

Column 2, line 41, "A. STRUCTURE" should appear between the paragraphs.

Column 7, line 29, "In" should read --If--.

Column 7, line 48, "123" should be --13--.

Column 9, line 19, "the brake booster 13'" should be omitted.

Column 9, line 53, "power" should appear before "circuit".

Signed and Sealed this

Twenty-first Day of June 1977

[SEAL]

Attest:

RUTH C. MASON
Attesting Officer

C. MARSHALL DANN
Commissioner of Patents and Trademarks